(12) United States Patent
Sako (10) Patent No.: US 11,015,506 B2
(45) Date of Patent: May 25, 2021

(54) HOLDING MATERIAL FOR POLLUTION CONTROL ELEMENT, PRODUCTION METHOD THEREOF, AND POLLUTION CONTROL APPARATUS

(71) Applicant: 3M INNOVATIVE PROPERTIES COMPANY, St. Paul, MN (US)

(72) Inventor: Kenji Sako, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/753,925

(22) PCT Filed: Oct. 29, 2018

(86) PCT No.: PCT/IB2018/058454
§ 371 (c)(1),
(2) Date: Apr. 6, 2020

(87) PCT Pub. No.: WO2019/087042
PCT Pub. Date: May 9, 2019

(65) Prior Publication Data
US 2020/0330921 A1     Oct. 22, 2020

(30) Foreign Application Priority Data
Oct. 31, 2017    (JP) .............................. JP2017-210815

(51) Int. Cl.
| | |
|---|---|
| *F01N 3/28* | (2006.01) |
| *B01D 46/00* | (2006.01) |
| *B01D 46/24* | (2006.01) |
| *B01D 53/94* | (2006.01) |
| *C08J 5/02* | (2006.01) |
| *C08J 5/04* | (2006.01) |

(Continued)

(52) U.S. Cl.
CPC ....... *F01N 3/2853* (2013.01); *B01D 46/0002* (2013.01); *B01D 46/2418* (2013.01);
(Continued)

(58) Field of Classification Search
CPC .... F01N 3/2853; F01N 3/2011; F01N 3/2839; C08J 5/02; D04H 1/4234; C04B 2235/5264
(Continued)

(56) References Cited

U.S. PATENT DOCUMENTS 6,660,359 B1 * 12/2003 Wirth ....................... B32B 5/08
428/108
7,713,492 B2 * 5/2010 Maus .................... F01N 3/2853
422/179
(Continued)

FOREIGN PATENT DOCUMENTS

| EP | 2119886 | 11/2009 |
| EP | 2479395 | 7/2012 |

(Continued)

OTHER PUBLICATIONS

International Search Report for PCT International Application No. PCT/IB2018/058454, dated Apr. 16, 2019, 5 pgs.

*Primary Examiner* — Tom P Duong
(74) *Attorney, Agent, or Firm* — Harold C. Knecht, III (57) ABSTRACT

A holding material for a pollution control element which can sufficiently suppress scattering of inorganic fibers when the pollution control element is assembled in a casing, and which has a sufficiently high coefficient of friction. The holding material includes: a sheet-like main body made of first inorganic fibers having a minor axis in the range of from about 3 to 10 μm; and a surface layer which is provided on at least one surface of the main body and contains second inorganic fibers having a minor axis in the range of from about 1 to 15 nm.

20 Claims, 4 Drawing Sheets

(51) Int. Cl.
  *C08K 3/22* (2006.01)
  *D04H 1/4234* (2012.01)
  *F01N 3/021* (2006.01)
(52) U.S. Cl.
  CPC ............... *B01D 53/94* (2013.01); *C08J 5/02* (2013.01); *C08J 5/044* (2013.01); *C08K 3/22* (2013.01); *D04H 1/4234* (2013.01); *B01D 2255/20* (2013.01); *B01D 2279/30* (2013.01); *C08J 2333/00* (2013.01); *C08K 2003/2227* (2013.01); *C08K 2201/005* (2013.01); *D10B 2101/20* (2013.01); *F01N 3/0211* (2013.01); *F01N 3/2839* (2013.01); *F01N 2330/06* (2013.01); *F01N 2370/02* (2013.01); *F01N 2510/00* (2013.01)

(58) Field of Classification Search
  USPC ......................................................... 422/179
  See application file for complete search history.

(56) References Cited

U.S. PATENT DOCUMENTS

| | | | |
|---|---|---|---|
| 7,854,905 B2 | 12/2010 | Yasuda et al. | |
| 7,858,051 B2 | 12/2010 | Sako | |
| 8,974,570 B2 | 3/2015 | Okabe et al. | |
| 10,533,476 B2 | 1/2020 | Sako | |
| 2002/0025904 A1* | 2/2002 | Goto | F01N 3/2853 502/150 |
| 2005/0232827 A1* | 10/2005 | Merry | F01N 3/2857 422/179 |
| 2008/0078150 A1* | 4/2008 | Kariya | F01N 3/2864 55/490 |
| 2009/0049831 A1 | 2/2009 | Yasuda et al. | |
| 2009/0072498 A1* | 3/2009 | Tanahashi | C04B 35/803 277/650 |
| 2012/0207967 A1* | 8/2012 | Pyzik | C04B 37/005 428/116 |
| 2013/0221567 A1* | 8/2013 | Jorgensen | D04H 1/425 264/241 |
| 2017/0151748 A1* | 6/2017 | Motomura | B32B 7/02 |
| 2017/0151752 A1* | 6/2017 | Nakamura | B32B 3/26 |

FOREIGN PATENT DOCUMENTS

| | | |
|---|---|---|
| EP | 2985435 | 2/2016 |
| JP | 57-061686 | 4/1982 |
| WO | WO 2006-020058 | 2/2006 |
| WO | WO 2012-088003 | 6/2012 |
| WO | WO 2015-179589 | 11/2015 |

* cited by examiner

HOLDING MATERIAL FOR POLLUTION CONTROL ELEMENT, PRODUCTION METHOD THEREOF, AND POLLUTION CONTROL APPARATUS

CROSS REFERENCE TO RELATED APPLICATIONS

This application is a national stage filing under 35 U.S.C. 371 of PCT/IB2018/058454, filed Oct. 29, 2018, which claims the benefit of Japan Application No. 2017-210815, filed Oct. 31, 2017, the disclosures of which are incorporated by reference in their entireties herein.

TECHNICAL FIELD

The present disclosure relates to a holding material for a pollution control element, a production method thereof, and a pollution control apparatus.

BACKGROUND ART

Exhaust gas from automobile engines contains carbon monoxide (CO), hydrocarbons (HC), nitrogen oxides (NOx), and the like. Exhaust gas from diesel engines further contains particulate matter such as soot. As means to remove these, exhaust gas cleaning systems using a ceramic catalytic converter or a diesel particulate filter (DPF) are known. In addition, the mounting of a gasoline particulate filter (GPF) has also been investigated.

A general form of a ceramic catalytic converter includes, for example, a catalyst carrier made of a honeycomb-shaped ceramic, a casing that stores the catalyst carrier, and a thermal insulation material that fills a gap between the outer circumferential surface of the catalyst carrier and the interior surface of the casing. The thermal insulation material holds the catalyst carrier and prevents mechanical shock due to impact, vibration, and the like from being inadvertently applied to the catalyst carrier. Thereby, breaking and moving of the catalyst carrier can be sufficiently suppressed, and the desired effect can be provided over a long period of time. This type of thermal insulation material is also commonly called a holding material because the material has a function of holding a pollution control element such as a catalyst carrier.

Normally the holding material is primarily made of inorganic fibers, from the prospect of providing excellent thermal insulation and heat resistance (refer to JP 57-61686 A and JP 2002-66331 A). However, when a pollution control element is installed together with the holding material inside the casing, the inorganic fibers or broken pieces thereof, powders, or the like (these are also called "fiber pieces" hereafter) scatter to the surrounding area, which carries the risk of adversely affecting the ambient environment. Therefore, conventionally, there have been an attempt to cause an organic binder to be impregnated into or applied to a mat made of inorganic fibers in order to prevent scattering of the fiber pieces. For example, JP 2006-223920 A describes a holding material where at least two types of organic binders with different glass transition temperatures (Tg) are impregnated into a mat made of fiber materials.

SUMMARY OF INVENTION

Impregnating a mat made of a fiber material with an organic binder is effective for suppressing the scattering of fiber pieces. However, due to the exhaust gas regulations, which are becoming more strict year by year, the amount of organic binder used tends to be restricted. On the other hand, after the holding material is housed together with the pollution control element inside the casing, there is a demand for the holding material to have a sufficiently high coefficient of friction with respect to a surface with which the holding material is in contact (interior surface of the casing and/or outer circumferential surface of the pollution control element), and to thereby fulfill a role of preventing the pollution control element from moving from a prescribed position inside the casing, for example.

An object of the present disclosure is to provide a holding material which can suppress scattering of inorganic fiber materials when a pollution control element is assembled in a casing, and which has a high coefficient of friction.

One aspect of the present disclosure relates to a holding material. This holding material includes: a sheet-like main body made of first inorganic fibers having a minor axis in the range of from about 3 to 10 μm; and a surface layer which is provided on at least one surface of the main body and contains second inorganic fibers having a minor axis in the range of from about 1 to 15 nm.

Another aspect of the present disclosure relates to a pollution control apparatus. This pollution control apparatus includes: a casing; a pollution control element provided within the casing; and the holding material arranged between the casing and the pollution control element.

Yet another aspect of the present disclosure relates to a method of producing a holding material. This production method includes: a step of applying a colloidal solution comprising second inorganic fibers having a minor axis in the range of from about 1 to 15 nm to a surface of a sheet-like main body made of first inorganic fibers having a minor axis in the range of from about 3 to 10 μm; and a step of drying the colloidal solution applied to the surface of the main body.

The present disclosure provides a holding material which can sufficiently suppress scattering of inorganic fiber materials when a pollution control element is assembled in a casing, and which has a high coefficient of friction.

DESCRIPTION OF EMBODIMENTS

The holding material according to this embodiment primarily includes: a sheet-like main body made of first inorganic fibers having a minor axis in the range of from about 3 to 10 μm; and a surface layer which is provided on at least one surface of the main body and contains second inorganic fibers having a minor axis in the range of from about 1 to 15 nm. This holding material allows for the scattering of fiber pieces to be suppressed when a pollution control element is installed inside a casing because a surface layer including second inorganic fibers, which are microfibers, is provided on the surface of the main body. In addition, the holding material of this embodiment allows for a high coefficient of static friction to be maintained after the holding material is housed together with the pollution control element inside the casing, because the surface layer is in contact with the interior surface of the casing and/or the outer circumferential surface of the pollution control element, and as a result, the pollution control element can be prevented from moving from a prescribed position inside the casing.

The holding material of this embodiment is produced by the steps of: applying a colloidal solution including second inorganic fibers having a minor axis in the range of from about 1 to 15 nm to a surface of a sheet-like main body made of first inorganic fibers having a minor axis in the range of from about 3 to 10 μm; and drying the colloidal solution applied to the surface of the main body.

Here, the "minor axis" of the first and second inorganic fibers refers to the average diameter of the fiber cross section, and the "major axis" refers to the average length (average fiber length) in the longitudinal direction of the fiber. In addition, the aspect ratio of the first and second inorganic fibers refers to a ratio determined by dividing the major axis of the fiber by the minor axis. In this specification, inorganic fibers refer to inorganic materials having an aspect ratio of not less than 5.

A pollution control element (for example, a catalyst carrier and a filter element) is held by the holding material inside a pollution control apparatus (for example, a catalyst converter). At this time, the holding force of the pollution control element is proportional to the product of the surface pressure and the coefficient of static friction.

Therefore, the holding force of the pollution control element can be enhanced by increasing the surface pressure of the holding material through increasing the amount of compression of the holding material, or by increasing the coefficient of static friction of the holding material. In the holding material of this embodiment, the surface layer including the second inorganic fibers having a minor axis in the range of from about 1 to 15 nm is in contact with the interior surface of the casing or the outer circumferential surface of the pollution control element. This surface layer imparts to the holding material a surface shape having a higher coefficient of friction than the surfaces of the first inorganic fibers or other inorganic fibers constituting the main body of the holding material. Furthermore, due to the presence of such a surface shape, the coefficient of friction between the surface of the holding material and the surface of the pollution control element or the surface of the casing can be increased. The coefficient of friction between the holding material and the casing can be increased especially when the casing is formed from a metal plate such as stainless steel (SS). On the other hand, the coefficient of friction between the holding material and the pollution control element increases particularly when the pollution control element is formed from a ceramic.

Embodiments of the present disclosure will be described hereinafter in detail with reference to the drawings.

Figure 1:
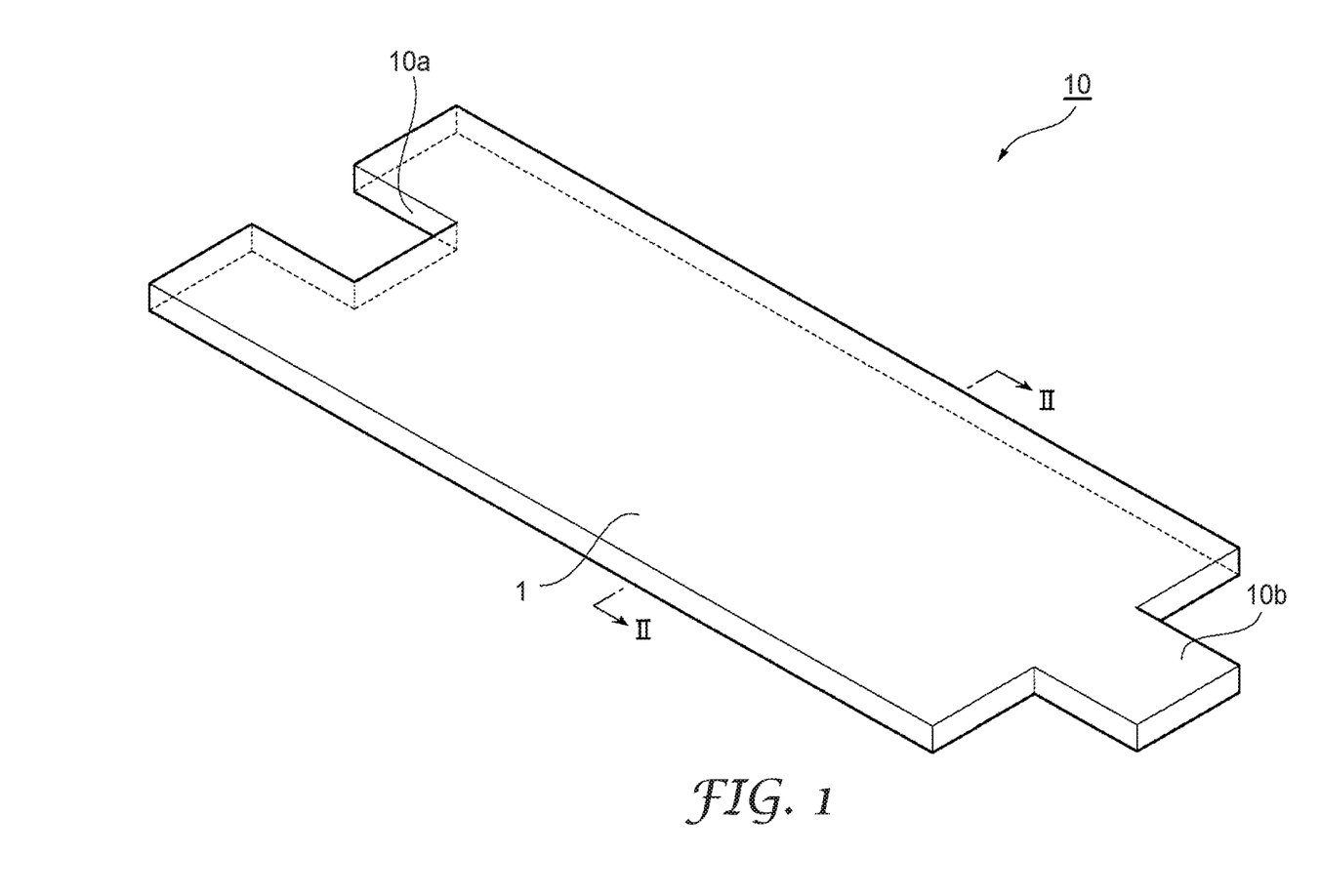
FIG. 1 is a perspective view illustrating a holding material according to an embodiment of the present disclosure.

FIG. 1 is a perspective view showing an example of a holding material of the present embodiment. The holding material 10 illustrated in FIG. 1 is for wrapping a pollution control element 30 having a circular cylinder or elliptical cylinder outer shape to hold the pollution control element 30 in a casing 20 (refer to FIG. 3). The holding material 10 has a length that corresponds to the length of the outer circumference of the pollution control element 30. The holding material 10 has, for example, a protruding portion 10a on a first end and a recessed portion 10b on a second end, and the protruding portion 10a and the recessed portion 10b are shaped so as to fit together when the holding material 10 is wrapped around the pollution control element 30. Note that it is only necessary for the fitting portion to be able to effectively prevent the leaking of exhaust gas. The fitting portion may also have another form such as an L-shape, and the shape or the like of the fitting is not particularly limited.

Figure 2:
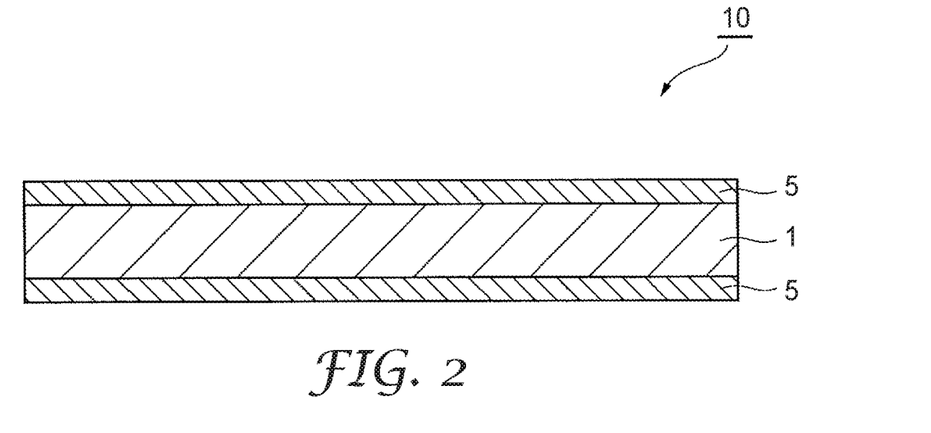
FIG. 2 is a schematic cross-sectional view taken along line II-II of FIG. 1.

As illustrated in FIG. 2, the holding material 10 includes: a sheet-like main body 1 having a thickness of about 5 to 15 mm; and a surface layer 5 having a thickness of about 0.1 to 2 mm provided on both sides of the main body 1. The main body 1 is formed from first inorganic fibers having a minor axis (average diameter) of about 3 to 10 μm; and other components compounded as necessary. The surface layer 5 is formed from second inorganic fibers having a minor axis (average diameter) of about 1 to 15 nm; and other components compounded as necessary. Note that the holding material 10 may be a holding material having a surface layer 5 on one surface thereof. For example, when the casing 20 is made of stainless steel, the interior surface thereof becomes rough due to oxidation under high-temperature conditions, and when a sufficiently high coefficient of friction can be secured with respect to the holding material 10 as a result, the main body 1 needs only to have the surface layer 5 on the side in contact with the pollution control element 30.

As described above, the surface layer 5 is formed from second inorganic fibers, which are microfibers, and other components compounded as necessary. The minor axis of the second inorganic fibers may be about 1 nm to 15 nm; for example, the minor axis may be not less than about 1 nm, not less than about 2 nm, or not less than about 3 nm and not greater than about 15 nm, not greater than about 8 nm, or not greater than about 5 nm. Second inorganic fibers having a minor axis of not less than 1 nm have the advantage of being more accessible than finer inorganic fibers. In addition, at the time of the production of the pollution control apparatus, it tends to be possible to suppress the scattering of fiber pieces. On the other hand, second inorganic fibers having a minor axis of not greater than 15 nm tend to be able to suppress the actual generation of fiber pieces itself at the time of the production of the pollution control apparatus in comparison to thicker inorganic fibers. The average length of the second inorganic fibers may be, for example, from about 500 to 5000 nm, from about 1000 to 4000 nm, or from about 1400 to 3000 nm.

Note that the minor axis (average diameter) and average length (average fiber length) of the second inorganic fibers can be determined by measuring the thicknesses and lengths of e.g. 50 or more fibers, which are randomly sampled from a microscopic image (TEM image, SEM image, or the like), and calculating the average values thereof. This may also apply to the first inorganic fibers and third inorganic fibers described below. The aspect ratio of the inorganic fibers is calculated by dividing the value of the average length by the average of the minor axis.

The aspect ratio of the second inorganic fibers may be, for example, from about 60 to 2000, from about 100 to 1500, or from about 300 to 800. Second inorganic fibers having an aspect ratio of not less than 60 tend to be able to suppress the scattering of fiber pieces at the time of the production of the pollution control apparatus in comparison to inorganic fibers having a smaller aspect ratio. On the other hand, second inorganic fibers having an aspect ratio of not higher than 2000 have the advantage of being more accessible than inorganic fibers having a larger aspect ratio.

Examples of the second inorganic fibers include fibers made of a material such as alumina or a hydrate thereof. For example, when the second inorganic fibers are made of an alumina hydrate, aluminum alkoxide is prepared as a raw material, and this may be used in a sol-gel method to synthesize a fiber-like alumina hydrate (composition formula: $Al_2O_3\text{-}nH_2O$ (n=1 to 1.5)). The crystal system of this alumina hydrate is boehmite or pseudo-boehmite. A commercially available product may be used as the second inorganic fibers. Specific examples thereof include Alumisol F-1000 and Alumisol F-3000 (both trade names) manufactured by Kawaken Fine Chemicals Co., Ltd. Alumisol F-1000 is an alumina microfiber having an average minor axis of about 4 nm and an average major axis of about 1000 nm (average aspect ratio: about 250), and Alumisol F-3000 is an alumina microfiber having an average minor axis of about 4 nm and an average major axis of about 3000 nm (average aspect ratio: about 750).

The surface layer 5 may further contain particulate first inorganic fine particles in addition to the second inorganic fibers or may further contain third inorganic fibers having a smaller aspect ratio than the aspect ratio of the second inorganic fibers. By compounding the first inorganic fine particles or third inorganic fibers into the surface layer 5, the coefficient of friction of the surface layer 5 can be adjusted. The shape of the first inorganic fine particles is not limited, and examples thereof include a substantially spherical shape, an elliptical shape, and an amorphous shape. The average particle size of the first inorganic fine particles is preferably not greater than 1 μm and more preferably not greater than 500 nm from the perspective of sintering properties. On the other hand, the lower limit of the average particle size of the first inorganic fine particles is preferably 1 nm and more preferably 4 nm from the perspective of handling properties and accessibility. Note that the average particle size of the first inorganic fine particles can be typically measured using a BET method for example. AS520 manufactured by Nissan Chemical Industries, Ltd., for example, may be used as the first inorganic fine particles. AS520 has an average diameter in the range of from about about 10 to 20 nm.

The aspect ratio of the third inorganic fibers may be, for example, from about 5 to 30 or from about 10 to 20. Third inorganic fibers having an aspect ratio of not less than 5 tend to be able to suppress the actual scattering of the third inorganic fibers at the time of the production of the pollution control apparatus in comparison to inorganic fibers having a smaller aspect ratio. On the other hand, third inorganic fibers having an aspect ratio of not higher than 30 contribute to the increase in the coefficient of friction more easily than inorganic fibers having a larger aspect ratio. The minor axis of the third inorganic fibers may be, for example, from about 1 to 15 nm or from about 5 to 10 nm.

Examples of the third inorganic fibers include fibers made of a material such as alumina or a hydrate thereof. Specific examples thereof include AS100 and AS200 (both trade names) manufactured by Nissan Chemical Industries, Ltd. These are alumina fibers having an average minor axis of about 10 nm and an average major axis of about 100 nm (average aspect ratio: about 10).

When the surface layer 5 contains both the second inorganic fibers and the first inorganic fine particles, the ratio $(W_1/(W_2+W_{p1}))$ of the mass $(W_{p1})$ of the first inorganic fine particles to the total mass $(W_2+W_{p1})$ of the second inorganic fibers and the first inorganic fine particles may be, for example, from 0.1 to 0.9, from 0.2 to 0.8, or from 0.25 to 0.75. When this ratio is not less than 0.1, the coefficient of friction of the surface layer 5 is more easily increased, whereas when the ratio is not greater than 0.9, the scattering of the first inorganic fine particles themselves can be suppressed at the time of the production of the pollution control apparatus.

When the surface layer 5 contains both the second inorganic fibers and the third inorganic fibers, the ratio $(W_3/(W_2+W_3))$ of the mass $(W_3)$ of the third inorganic fibers to the total mass $(W_2+W_3)$ of the second inorganic fibers and the third inorganic fibers may be, for example, from 0.1 to 0.9, from 0.2 to 0.8, or from 0.25 to 0.75. When this ratio is not less than 0.1, the coefficient of friction of the surface layer 5 is more easily increased, and when the ratio is not greater than 0.9, the scattering of the third inorganic fibers themselves can be suppressed at the time of the production of the pollution control apparatus.

The main body 1 contains first inorganic fibers. Specific examples of the first inorganic fibers include glass fibers, ceramic fibers, carbon fibers, silicon carbide fibers, and boron fibers, but other inorganic fibers may also be used if necessary. One kind selected from the above may be used alone as the first inorganic fibers, or a combination of two or more kinds may be used, and the first inorganic fibers may also be composite fibers. Among these, particularly preferable examples are ceramic fibers such as alumina fibers, silica fibers, and alumina-silica fibers. One kind of the ceramic fibers may be used alone, a combination of two or more kinds of the ceramic fibers may be used, or the ceramic fibers may be composite fibers. Other inorganic materials may be used as additives together with the ceramic fibers described above or other inorganic fibers. Examples of preferable additives include zirconia, magnesia, calcia, chromium oxide, yttrium oxide, and lanthanum oxide. The additives are typically used in a form of powder or fine particles, and one kind of the additives may be used alone, or a mixture of two or more kinds of additives may be used.

The minor axis (average diameter) of the first inorganic fibers is in the range of from about 3 to 10 μm. When the minor axis of the first inorganic fibers is not less than about 3 μm, a main body 1 having sufficient strength is easy to obtain, whereas when the minor axis is not greater than about 10 μm, the main body 1 tends to be easy to mold.

The average length of the first inorganic fibers is, for example, from about 0.5 to 200 mm. When the average length of the inorganic fibers is not less than about 0.5 mm, the scattering of fiber pieces is easy to suppress, whereas when the average length is not greater than about 200 mm, the handleability tends to be excellent, which makes it easy to smoothly advance the production process of the holding material 10.

The aspect ratio of the first inorganic fibers may be, for example, from about 1000 to 70000, from about 5000 to 50000, or from about 10000 to 30000. First inorganic fibers having an aspect ratio of not less than 1000 tend to be able to suppress the scattering of fiber pieces at the time of the production of the pollution control apparatus in comparison to inorganic fibers having a smaller aspect ratio. On the other hand, first inorganic fibers having an aspect ratio of not greater than 70000 have the advantage of being more accessible than inorganic fibers having a larger aspect ratio.

The main body 1 can be an alumina fiber sheet primarily made of a multilayer sheet of alumina fibers. The average length of the alumina fibers in the alumina fiber sheet is preferably in the range of from about 20 to 200 mm; the minor axis (average diameter) of the fibers is preferably in the range of from about 1 to 40 μm; and the aspect ratio is preferably in the range of from about 5000 to 50000. Furthermore, the alumina fibers are preferably made of mullite composition with an $Al_2O_3/SiO_2$ mass ratio ($Al_2O_3/SiO_2$) in the range of from about 70/30 to 74/26.

For example, the alumina fiber sheet can be produced using a spinning dope made from a mixture of an alumina source such as aluminum oxychloride, a silica source such as silica sol, an organic binder such as a polyvinyl alcohol, and water. In other words, the sheet can be produced by piling spun alumina fiber precursors to form a sheet, and then calcinating at a high temperature typically of about 1000 to 1300° C. Subsequently, the sheet is preferably a molded body that has been subjected to needle punching. Such a sheet can ensure shape retainability by itself because the inorganic fiber materials constituting the sheet are entangled with each other.

The organic binder and/or second inorganic fine particles may be contained in a dispersed state inside the main body 1 as necessary. The organic binder and the second inorganic fine particles are preferably dispersed roughly uniformly inside the main body 1.

The organic binder attaches to the inorganic fibers constituting the main body 1 to suppress the scattering of fiber pieces. The amount of the organic binder, on the basis of the total mass of the holding material 10, may be, for example, not greater than 3 mass % and may be in the range of about 0.5 to 2 mass %. Suitable examples of the organic binder include natural or synthetic polymer materials, such as resin materials including butadiene-styrene resin, polystyrene resin, polyvinyl acetate resin, acrylic resin, and the like, or organic materials including polyvinyl alcohols and the like. The organic binder is preferably an acrylic latex.

Figure 3:
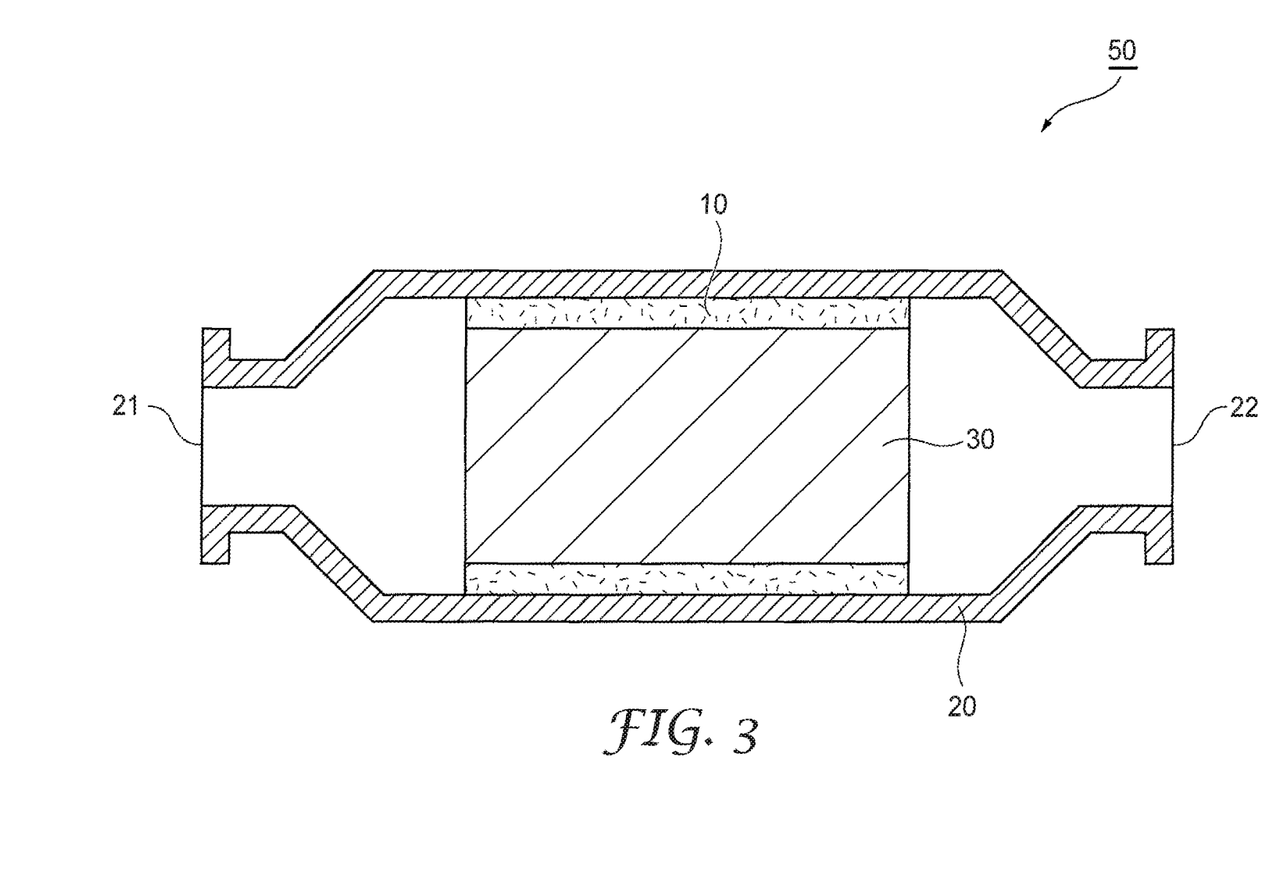
FIG. 3 is a cross-sectional view schematically illustrating an embodiment of the pollution control apparatus according to the present disclosure.

The acrylic latex can be a plurality of types, but is preferably selected from those having a favorable glass transition temperature (Tg) from the perspective of the composition of the holding material 10 and the properties required of the pollution control element 30. It is known that acrylic latexes typically have a Tg in a range of about −70 to 50° C. In the present embodiment, a latex with a Tg of 15° C. or lower is preferable, and a latex with a Tg of 1° C. or lower or −10° C. or lower can also be used. If an acrylic latex with a Tg of 15° C. or lower is used, sufficiently high wettability can be exhibited toward the inorganic fibers in the mat at a typical working temperature (25° C.) where the pollution control element 30 is mounted in the casing 20, so the scattering of the fiber pieces can be effectively suppressed.

The organic binder that is used in the present embodiment can be any of various types of acrylic latexes as long as there is not an adverse effect on the properties of the holding material 10 and the like, and as desired, a commercially available acrylic latex can be used as is, or can be arbitrarily modified to match the environment where the holding material will be used. A suitable acrylic latex is a colloidal dispersion obtained by dispersing an acrylic resin in an aqueous medium or other medium.

The second inorganic fine particles may be impregnated into the main body 1 together with the organic binder. In this case, the second inorganic fine particles are preferably present in a dispersed state inside the main body 1. More specifically, prior to heating the holding material 10, the second inorganic fine particles are present together with the organic binder by attaching to the surfaces or intersection points of the inorganic fibers. Later, when the holding material 10 is exposed to high temperature conditions where the organic binder will combust, sintering of the second inorganic fine particles will proceed and the second inorganic fine particles that have adhered to the surface of the inorganic fiber material will attach to the inorganic fibers so as to form a sintered body, thereby increasing the roughness of the surface of the inorganic fibers and possibly playing a role in inhibiting sliding of the inorganic fibers together. On the other hand, the second inorganic fine particles that attach to the intersection points of the inorganic fibers form a sintered body and restrain the intersection points and are thought to play a role in maintaining the three-dimensional shape of the inorganic fibers. It is thought that the holding material 10 will not easily be compressed in the thickness direction and sufficiently high contact pressure can be maintained by the function of such second inorganic fine particles.

The second inorganic fine particles can be any particles that can bond to the inorganic fibers. Preferable specific examples include particles formed from fine particles comprising metal oxides, nitrides, carbides, and composite materials thereof. These fine particles can be used individually as a single type, or two or more types can be used together. When the main body 1 contains alumina fibers, the second inorganic fine particles are preferably formed from fine particles selected from silica fine particles, alumina fine particles, titania fine particles, and zirconia fine particles from the perspective of bonding to the alumina fiber. These fine particles can be procured in the state of a colloidal solution. The second inorganic fine particles contained in the main body 1 may be the same as or different than the first inorganic fine particles contained in the surface layer 5.

Note that, in the present embodiment, the size or shape of the second inorganic fine particles is not limited as long as the second inorganic fine particles can attach to the inorganic fibers and can remain in the sheet even after the organic binder has combusted when the holding material is used in the pollution control apparatus. However, the average particle size of the second inorganic fine particles is preferably not greater than 1 μm and more preferably not greater than 500 nm or less from the perspective of sintering properties. The lower limit of the average particle size of the second inorganic fine particles is preferably 1 nm and more preferably 4 nm from the perspective of handling properties and ease of procurement. Note that the average particle size can be typically measured using a BET method for example.

Since the holding material 10 of this embodiment includes the surface layer 5 including the second inorganic fibers, the scattering of fiber pieces can be sufficiently suppressed when the pollution control element 30 is installed inside the casing 20. Specifically, with the holding material 10, the scattering ratio of fiber pieces can be kept to not greater than 0.09 mass %, and this value is more preferably not greater than 0.07 mass %. The "scattering ratio of fiber pieces" described here refers to a measurement value according to the "Measurement of Scattering Ratio of Fiber Pieces" described in the Examples section.

Because the holding material 10 includes the surface layer 5 including the second inorganic fibers, the holding material 10 has a high coefficient of static friction. The coefficient of static friction of the holding material 10 with respect to the interior surface of the casing 20 (made of stainless steel, for example) is, for example, not less than 0.30 and is more preferably from 0.35 to 1.0. The coefficient of static friction of the holding material 10 with respect to the outer circumferential surface of the pollution control element 30 (for example, a catalyst carrier manufactured by NGK Insulators, Ltd.) is more preferably not less than 0.60, for example.

Next, the method of producing the holding material 10 is described. The production method of this embodiment includes the steps of: applying a colloidal solution containing second inorganic fibers having an aspect ratio in the range of from about 60 to 2000 to the surface of a sheet-like main body 1 made of first inorganic fibers having an average thickness in the range of from about 3 to 10 μm; and applying heat to the main body 1 having a surface coated with the colloidal solution. With the production method described above, a holding material 10 in which a surface layer 5 is formed on at least the surface of the main body 1 can be obtained.

The colloidal solution used in the formation of the surface layer 5 is prepared by dispersing second inorganic fibers into an aqueous solution. By adding hydrochloric acid, nitric acid, or acetic acid as a stabilizer of the second inorganic fibers, the state in which the second inorganic fibers are dispersed to a high degree in the aqueous solution can be maintained.

The application of the colloidal solution to the surface of the main body 1 may be achieved, for example, by spray coating, roll coating, film transfer, curtain coating, and the like. The applied amount (solid content mass) per unit area may be, for example, from 0.5 to 20 g/m$^2$ or from 0.8 to 16 g/m$^2$. The drying process after coating is for forming the surface layer 5 by volatilizing the water content. For example, the main body 1 coated with the colloidal solution may be dried in a warm air drier set at 80 to 250° C. for 10 to 180 minutes. As a result, the surface layer 5 is formed on the surface of the main body 1.

Note that when a sheet made of inorganic fibers containing an organic binder and second inorganic fine particles is used as the main body 1, the following steps should be performed prior to the formation of the surface layer 5.

Step (a) of impregnating a sheet formed from first inorganic fibers with a colloidal solution comprising second inorganic fine particles and an organic binder; and Step (b) of drying the sheet impregnated with the colloidal solution to obtain the main body 1.

In step (a), the composition of the colloidal solution is preferably adjusted so that the amount of the second inorganic fine particles inside the sheet is in the range of from about 1 to 10 mass % on the basis of the total mass of the main body 1. When the amount of the second inorganic fine particles is not less than 1 mass %, sufficient surface pressure is easily achieved, whereas when the amount is not greater than 10 mass %, flexibility sufficient to wrap the holding material 10 around the pollution control element is easily achieved.

The step (b) may be any drying step as long as the drying step can dry the sheet obtained by the step (a). For example, the sheet obtained by the step (a) may be dried in a warm air drier set at 80 to 250° C. for 10 to 180 minutes.

As illustrated in FIG. 3, the holding material 10 is used to hold a pollution control element 30 in a pollution control apparatus 50. A specific example of the pollution control element 30 is a catalyst carrier or filter element or the like for cleaning the exhaust gas from an engine. A specific example of the pollution control apparatus 50 is a catalytic converter or an exhaust cleaning device (such as a diesel particulate filter device).

The pollution control apparatus 50 illustrated in FIG. 3 has a casing 20, a pollution control element 30 provided in the casing 20, and a holding material 10 provided between the interior surface of the casing 20 and the outer circumferential surface of the pollution control element 30. The pollution control apparatus 50 also provides a gas flow inlet 21 that introduces exhaust gas to the pollution control element 30, and a gas flow outlet 22 that discharges exhaust gas that has passed through the pollution control element 30.

The width of the gap between the interior surface of the casing 20 and the outer circumferential surface of the pollution control element 30 is preferably from about 1.5 to 15 mm from the perspective of reducing the used amount of holding material 10 and ensuring hermeticity. The holding material 10 is preferably in a suitably compressed condition in order to provide a suitable bulk density between the casing 20 and the pollution control element 30. By using the holding material 10 to hold the pollution control element 30, scattering of inorganic fiber material during the production process can be sufficiently suppressed, and sufficiently high surface pressure and coefficient of static friction can be maintained between the interior surface of the casing 20 and the pollution control element 30. In addition, the bulk density during assembly can be set lower than the bulk density of conventional products, and thus the used amount of relatively expensive inorganic fiber material can be reduced. Examples of the method for compressing and assembling the holding material 10 include clamshell method, stuffing method, tourniquet method, and the like.

The pollution control apparatus 50 can firmly hold the pollution control element 30 in the casing 20 by including the holding material 10 having a high coefficient of static friction.

For example, for the case where the pollution control apparatus 50 is a catalytic converter, the catalytic converter is preferably a monolith type catalytic converter, where the catalytic converter has a monolith shaped catalyst element. The catalytic converter is made of a catalyst element with small channels with a honeycomb cross section, and therefore the size is smaller than a conventional pellet type catalytic converter. Furthermore, the contact surface area with the exhaust gas can be sufficiently ensured, so exhaust resistance can be minimized, and the exhaust gas can be processed more effectively. This catalytic converter can be advantageously used in combination with various types of internal combustion engines in order to process the exhaust gas. In particular, excellent effects can be sufficiently demonstrated when a catalytic converter of this construction is installed in an exhaust system for an automobile such as a passenger car, bus, truck, or the like.

The catalyst that is supported by the catalyst carrier is generally a metal (such as platinum, ruthenium, osmium, rhodium, iridium, nickel, palladium, or the like) or a metal oxide (such as vanadium pentaoxide, titanium dioxide, or the like), and is preferably used in a coated form. Note that, by employing a filter element in place of the catalyst carrier, the filter element can constitute a pollution control apparatus as a diesel particulate filter.

EXAMPLES

The present invention is described while referring to examples. Note that, the present invention is not limited to these examples.

Example 1

Production of Main Body

A colloidal solution containing an organic binder and second inorganic fine particles was prepared by adding the following chemicals at one-minute intervals to 10 L of stirred water.

(1) Aluminum sulfate (aqueous solution with a solid content concentration of 40%): 6 g (2) Organic binder (acrylic latex LX874 (trade name), manufactured by the Zeon Corporation): 2.6 g (3) Colloidal silica (Snotex-O (trade name), manufactured by Nissan Chemical Industries, Ltd.): 10 g (4) Liquid sodium aluminate (solid content: 40%): 3.5 g A needle punched alumina fiber blanket (Maftec MLS-2 Blanket (trade name), manufactured by Mitsubishi Chemical Co., Ltd.) was cut to a size of 15 cm×40 cm. This was placed on a metal mesh, and after the colloidal solution described above was poured from above, water was suction-dehydrated from the blanket for 15 seconds on the metal mesh. After the colloidal solution described above was impregnated into the blanket in this manner, the blanket was dried for 45 minutes in a warm air drier set to a temperature of 170° C. As a result, the main body of a holding material was produced.

Formation of Surface Layer

Alumisol F-3000 (manufactured by Kawaken Fine Chemicals Co., Ltd., solid content concentration: 5 mass %) was prepared as a colloidal solution comprising second inorganic fibers. The second inorganic fibers had an average minor axis of 4 nm, an average major axis of 3000 nm, and an aspect ratio (major axis/minor axis) of 750. After 72 parts by mass of water was added to 40 parts by mass of the alumina sol, the mixture was stirred for one minute to prepare a colloidal solution for surface layer formation. The colloidal solution was applied to the surface of the main body using a PS-9513 spray gun (trade name, manufactured by Anest Iwata Corporation). The applied amount was adjusted so that the mass of the solid content per unit area was 16 g/m$^2$. This was subjected to drying treatment over the course of 45 minutes with a warm air drier set to 170° C. to form a surface layer on one surface of the main body. The holding material of this example was obtained by forming a surface layer (solid content mass: 16 g/m$^2$) in the same manner on the other surface of the main body. Note that the loss on heating (LOI) of the obtained holding material was 1.1 mass %. This amount was used as the content of the organic binder contained in the holding material.

Example 2

The holding material of this example was obtained in the same manner as in Example 1 with the exception that the amount (solid content) of the colloidal solution for surface layer formation applied to both sides of the main body was set to 8 g/m$^2$ instead of 16 g/m$^2$.

Example 3

The holding material of this example was obtained in the same manner as in Example 1 with the exception that the amount (solid content) of the colloidal solution for surface layer formation applied to both sides of the main body was set to 0.8 g/m$^2$ instead of 16 g/m$^2$.

Example 4

The holding material of this example was obtained in the same manner as in Example 1 with the exception that the amount (solid content) of the colloidal solution for surface layer formation applied to both sides of the main body was set to 0.4 g/m$^2$ instead of 16 g/m$^2$.

Example 5

The holding material of this example was obtained in the same manner as in Example 1 with the exception that Alumisol F-1000 (manufactured by Kawaken Fine Chemicals Co., Ltd., solid content concentration: 5 mass %) was used instead of using Alumisol F-3000 as the colloidal solution containing the second inorganic fibers. The second inorganic fibers had an average minor axis of 4 nm, an average major axis of 1400 nm, and an aspect ratio (major axis/minor axis) of 350.

Example 6

The holding material of this example was obtained in the same manner as in Example 2 with the exception that Alumisol F-1000 (manufactured by Kawaken Fine Chemicals Co., Ltd., fiber size: 4 nm×1400 nm was used instead of using Alumisol F-3000 as the colloidal solution comprising the second inorganic fibers.

Example 7

The holding material of this example was obtained in the same manner as in Example 3 with the exception that Alumisol F-1000 (manufactured by Kawaken Fine Chemicals Co., Ltd., fiber size: 4 nm×1,400 nm was used instead of using Alumisol F-3000 as the colloidal solution comprising the second inorganic fibers.

Comparative Example 1

A main body (without a surface layer) produced in the same manner as in Example 1 was used as a holding material in this example.

Comparative Example 2

The holding material of this example was obtained in the same manner as in Example 1 with the exception that alumina sol AS520 (manufactured by Nissan Chemical Industries, Ltd., solid content concentration: 20 mass %), which is in the form of particulate fine particles, was used instead of using Alumisol F-3000, and that the amount (solid content) of the colloidal solution for surface layer formation was set to 16 g/m$^2$. Note that, whereas the solid content concentration of Alumisol F-3000 is 5 mass %, the solid content concentration of alumina sol AS520 is 20 mass %, so this was used after diluting the solution to a solid content concentration of 5 mass %. The average particle size of the alumina sol AS520 was from 10 to 20 nm.

Comparative Example 3

The holding material of this example was obtained in the same manner as in Comparative Example 2 with the exception that the amount (solid content) of the colloidal solution for surface layer formation applied to both sides of the main body was set to 8 g/m$^2$ instead of 16 g/m$^2$.

Comparative Example 4

The holding material of this example was obtained in the same manner as in Comparative Example 2 with the exception that the amount (solid content) of the colloidal solution for surface layer formation applied to both sides of the main body was set to 0.8 g/m$^2$ instead of 16 g/m$^2$.

Comparative Example 5

The holding material of this example was obtained in the same manner as in Comparative Example 2 with the exception that the amount (solid content) of the colloidal solution for surface layer formation applied to both sides of the main body was set to 0.4 g/m² instead of 16 g/m².

Example 8

The holding material of this example was obtained in the same manner as in Example 1 with the exception that a colloidal solution prepared by mixing Alumisol F-3000 (75 parts by volume) and alumina sol AS520 diluted to a solid content concentration of 5% (25 parts by volume) was used instead of using Alumisol F-3000 as the colloidal solution comprising the second inorganic fibers, and that the applied amount (solid content) of the colloidal solution was set to 8 g/m².

Example 9

The holding material of this example was obtained in the same manner as in Example 8 with the exception that the applied amount (solid content) of the colloidal solution prepared by mixing Alumisol F-3000 (75 parts by volume) and alumina sol AS520 diluted to a solid content concentration of 5% (25 parts by volume) was set to 0.8 g/m² instead of 8 g/m².

Example 10

The holding material of this example was obtained in the same manner as in Example 1 with the exception that a colloidal solution prepared by mixing Alumisol F-3000 (50 parts by volume) and alumina sol AS520 diluted to a solid content concentration of 5% (50 parts by volume) was used instead of using Alumisol F-3000 as the colloidal solution comprising the second inorganic fibers, and that the applied amount (solid content) of the colloidal solution was set to 16 g/m².

Example 11

The holding material of this example was obtained in the same manner as in Example 8 with the exception that the applied amount (solid content) of the colloidal solution prepared by mixing Alumisol F-3000 (50 parts by volume) and alumina sol AS520 diluted to a solid content concentration of 5% (50 parts by volume) was set to 8 g/m² instead of 16 g/m².

Example 12

The holding material of this example was obtained in the same manner as in Example 8 with the exception that the applied amount (solid content) of the colloidal solution prepared by mixing Alumisol F-3000 (50 parts by volume) and alumina sol AS520 diluted to a solid content concentration of 5% (50 parts by volume) was set to 0.8 g/m² instead of 16 g/m².

Example 13

The holding material of this example was obtained in the same manner as in Example 1 with the exception that a colloidal solution prepared by mixing Alumisol F-1000 (75 parts by volume) and alumina sol AS520 diluted to a solid content concentration of 5% (25 parts by volume) was used instead of using Alumisol F-3000 as the colloidal solution comprising the second inorganic fibers, and that the applied amount (solid content) of the colloidal solution was set to 18 g/m². Note that, whereas the solid content concentration of Alumisol F-1000 is 5 mass %, the solid content concentration of alumina sol AS520 is 20 mass %, so this was used after diluting the solution to a solid content concentration of 5 mass %.

Example 14

The holding material of this example was obtained in the same manner as in Example 13 with the exception that the applied amount (solid content) of the colloidal solution prepared by mixing Alumisol F-1000 (75 parts by volume) and alumina sol AS520 diluted to a solid content concentration of 5% (25 parts by volume) was set to 8 g/m² instead of 16 g/m².

Example 15

The holding material of this example was obtained in the same manner as in Example 13 with the exception that the applied amount (solid content) of the colloidal solution prepared by mixing Alumisol F-1000 (75 parts by volume) and alumina sol AS520 diluted to a solid content concentration of 5% (25 parts by volume) was set to 0.8 g/m² instead of 16 g/m².

The following measurements were taken for the examples and comparative examples obtained as described above. The results are shown in Table 1.

Measurement of Scattering Ratio of Fiber Pieces

An impact tester was prepared in accordance with Japanese Industrial Standards (JIS K-6830) and then impact testing was performed in accordance with the directions shown in the standard.

(1) A test piece (size: 10 cm×10 mm) was prepared from a holding material (size: 15 cm×40 mm) using a punching die, and then the mass was measured.

(2) The test piece was placed in an impact tester as shown in JIS K-6830, and then an impact was applied from an angle of 60°.

(3) After testing, the test piece was removed from the impact tester and the mass was again measured.

(4) The amount of scattering (mass %) of the fiber pieces was calculated from the change in the test piece before and after testing.

Measurement of coefficient of static friction of holding material (stainless steel side)

Figure 4:
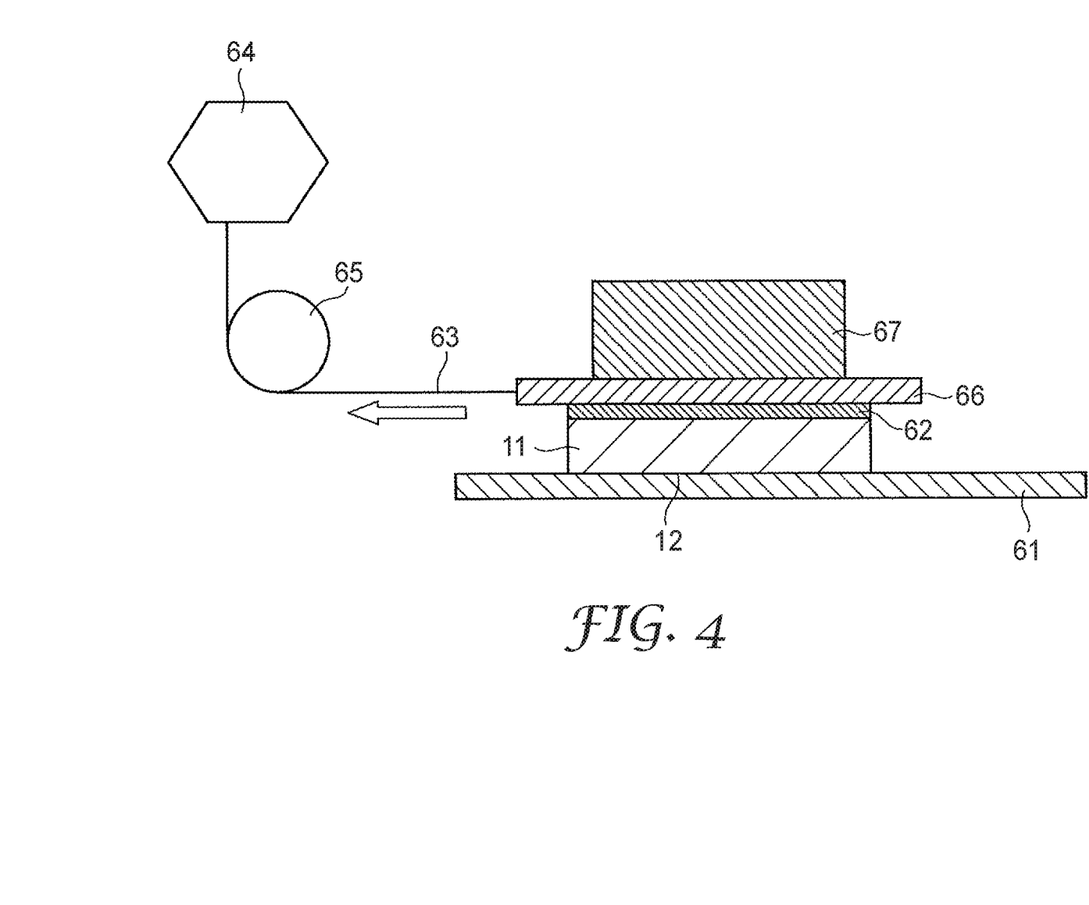
FIG. 4 is a cross-sectional view schematically illustrating an apparatus for measuring a coefficient of static friction of a holding material.

The coefficient of static friction between the stainless steel (SS) plate and the holding material was measured by the procedure described below using an Autograph AGS100D (trade name; manufactured by Shimadzu Corporation). Specifically, the holding material of each of the examples and comparative examples was cut out into a 50 mm square to prepare a test piece. As illustrated in FIG. 4, a test piece 11 was fixed by adhering, to an SS plate 66 via a double-sided adhesive tape 62, the surface of the test piece 11 located on the opposite side on a surface for measuring coefficient of static friction 12.

One end of an SS cord 63, which was about 1 m, was fixed to the SS plate 66, and the other end was fixed to a load cell 64 through a pulley block 65. At this time, the pulley block 65 was located directly below the load cell 64, and the SS plate 66 fixed to the test piece 11 was moved parallel to the ground when the load cell 64 was lifted up.

Next, the test piece 11 was placed on the plate 61 (SS plate) at a location where the SS cord 63 was horizontal and perpendicular to the central axis of the pulley block 65. An SS plate was used as the plate 61 instead of the casing; specifically, a plate prepared by subjecting the plate surface to 2B treatment (cold rolling treatment) and machining the surface so that the surface had a roughness Ra of 0.2 to 0.5 μm was used. The height of the load cell 64 was adjusted so that the test piece 11 could be located at the largest distance from the pulley block 65.

A load 67 of 12 kg was placed on the SS plate 66. Thereafter, the load cell 64 was lifted up, and SS cord 63 was pulled at a pulling speed of 100 mm/minute along the arrow direction. The load measured right before the test piece 11 started to slide on the surface of the plate 61 was recorded as a static friction force (N). The coefficient of static friction was calculated by dividing the static friction force by the load (N) applied to the test piece 11 including the SS plate 66.

Measurement of Coefficient of Static Friction of Holding Material (Catalyst Carrier Side)

The coefficient of static friction between the catalyst carrier used in the catalyst converter and the holding material was measured by the procedure described below using an Autograph AGS100D (trade name; manufactured by Shimadzu Corporation). Specifically, the holding material of each of the examples and comparative examples was cut out to a size of 50 mm×25 mm to prepare a test piece. As illustrated in FIG. 4, a test piece 11 was fixed by adhering, to an SS plate 66 via a double-sided adhesive tape 62, the surface of the test piece 11 located on the opposite side of the surface 12 for measuring coefficient of static friction.

Next, the test piece 11 was placed on the plate 61 (monolith body) at a location where the SS cord 63 was parallel to the ground surface and perpendicular to the central axis of the pulley block 65. A monolith body was used as the plate 61 instead of a catalyst carrier; specifically, a monolith body manufactured by NGK Insulators, Ltd. (Nippon Glass Co.) was used. The height of the load cell 64 was adjusted so that the test piece 11 could be located at the largest distance from the pulley block 65.

A load 67 of 5 kg was placed on the SS plate 66. Thereafter, the load cell 64 was lifted up, and SS cord 63 was pulled at a pulling speed of 100 mm/minute along the arrow direction. The load measured right before the test piece 11 started to slide on the surface of the plate 61 was recorded as a static friction force (N). The coefficient of static friction was calculated by dividing the static friction force by the load (N) applied to the test piece 11 including the SS plate 66.

TABLE 1

| | Surface layer | | | Scattering ratio of fiber pieces (mass %) | Coefficient of static friction | |
|---|---|---|---|---|---|---|
| | Colloidal solution | Aspect ratio | Coated amount (Solid content) | | Stainless steel side | Catalyst carrier side |
| Example 1 | F-3000 (minor axis: 4 nm) | 750 | 16 g/m$^2$ | 0.065 | 0.43 | 0.68 |
| Example 2 | F-3000 (minor axis: 4 nm) | 750 | 8 g/m$^2$ | 0.067 | 0.44 | 0.64 |
| Example 3 | F-3000 (minor axis: 4 nm) | 750 | 0.8 g/m$^2$ | 0.069 | 0.43 | 0.70 |
| Example 4 | F-3000 (minor axis: 4 nm) | 750 | 0.4 g/m$^2$ | 0.066 | 0.40 | 0.66 |
| Example 5 | F-1000 (minor axis: 4 nm) | 350 | 16 g/m$^2$ | 0.045 | 0.46 | 0.63 |
| Example 6 | F-1000 (minor axis: 4 nm) | 350 | 8 g/m$^2$ | 0.049 | 0.48 | 0.62 |
| Example 7 | F-1000 (minor axis: 4 nm) | 350 | 0.8 g/m$^2$ | 0.052 | 0.48 | 0.64 |
| Comparative Example 1 | — | — | — | 0.066 | 0.29 | 0.55 |
| Comparative Example 2 | AS 520 (particulate) | 1 | 16 g/m$^2$ | 0.092 | 0.51 | 0.70 |
| Comparative Example 3 | AS 520 (particulate) | 1 | 8 g/m$^2$ | 0.102 | 0.49 | 0.70 |
| Comparative Example 4 | AS 520 (particulate) | 1 | 0.8 g/m$^2$ | 0.083 | 0.34 | 0.62 |
| Comparative Example 5 | AS 520 (particulate) | 1 | 0.4 g/m$^2$ | 0.077 | 0.32 | 0.58 |
| Example 8 | F-3000 (75 parts by volume) AS520 (25 parts by volume) | 750 1 | 8 g/m$^2$ | 0.057 | 0.48 | 0.71 |
| Example 9 | F-3000 (75 parts by volume) Dilute AS520 (25 parts by volume) | 750 1 | 0.8 g/m$^2$ | 0.058 | 0.37 | 0.62 |
| Example 10 | F-3000 (50 parts by volume) Dilute AS520 (50 parts by volume) | 750 1 | 16 g/m$^2$ | 0.063 | 0.46 | 0.72 |
| Example 11 | F-3000 (50 parts by volume) Dilute AS52 (50 parts by volume | 750 1 | 8 g/m$^2$ | 0.065 | 0.47 | 0.71 |

TABLE 1-continued

| | Surface layer | | | Scattering ratio of fiber pieces (mass %) | Coefficient of static friction | |
|---|---|---|---|---|---|---|
| | Colloidal solution | Aspect ratio | Coated amount (Solid content) | | Stainless steel side | Catalyst carrier side |
| Example 12 | F-3000 (50 parts by volume) | 750 | 0.8 g/m² | 0.062 | 0.39 | 0.60 |
| | Dilute AS520 (50 parts by volume) | 1 | | | | |
| Example 13 | F-1000 (75 parts by volume) | 350 | 16 g/m² | 0.055 | 0.44 | 0.70 |
| | Dilute AS520 (25 parts by volume) | 1 | | | | |
| Example 14 | F-1000 (75 parts by volume) | 350 | 8 g/m² | 0.061 | 0.45 | 0.69 |
| | Dilute AS520 (25 parts by volume) | 1 | | | | |
| Example 15 | F-1000 (75 parts by volume) | 350 | 0.8 g/m² | 0.058 | 0.38 | 0.62 |
| | Dilute AS520 (25 parts by volume) | 1 | | | | |

The invention claimed is:

1. A holding material comprising:
a sheet-like main body made of first inorganic fibers having a minor axis in the range of from about 3 to 10 µm; and
a surface layer which is provided on at least one surface of the main body and contains second inorganic fibers having a minor axis in the range of from about 1 to 15 nm.

2. The holding material according to claim 1, wherein an aspect ratio of the second inorganic fibers is in the range of from about 60 to 2,000.

3. The holding material according to claim 1, wherein a material of the second inorganic fibers is alumina.

4. The holding material according to claim 1, wherein the surface layer further contains first inorganic fine particles or third inorganic fibers having a smaller aspect ratio than the aspect ratio of the second inorganic fibers.

5. The holding material according to claim 4, wherein a material of the first inorganic fine particles is alumina.

6. The holding material according to claim 4, wherein a ratio ($W_1/(W_2+W_1)$) of a mass ($W_1$) of the first inorganic fine particles to a total mass ($W_2+W_1$) of the second inorganic fibers and the first inorganic fine particles is in the range of from about 0.1 to 0.9.

7. The holding material according to claim 4 further comprising:
second inorganic fine particles dispersed inside the main body; wherein
the second inorganic fine particles are the same as or different than the first inorganic fine particles.

8. The holding material according to claim 7, wherein an average particle size of the second inorganic fine particles is not greater than 1 µm.

9. The holding material according to claim 4, wherein an average particle size of the first inorganic fine particles is not greater than 1 µm.

10. The holding material according to claim 1, further comprising an organic binder dispersed inside the main body.

11. The holding material according to claim 10, wherein an amount of the organic binder is not greater than 3 mass % on the basis of a total mass of the holding material.

12. The holding material according to claim 10, wherein the organic binder is acrylic latex.

13. The holding material according to claim 1, wherein the main body is a molded body.

14. A pollution control apparatus comprising:
a casing;
a pollution control element installed inside the casing; and
the holding material according to claim 1 arranged between the casing and the pollution control element.

15. A production method for a holding material comprising the steps of:
applying a colloidal solution comprising second inorganic fibers having a minor axis in the range of from about 1 to 15 nm to a surface of a sheet-like main body made of first inorganic fibers having a minor axis in the range of from about 3 to 10 µm; and
drying the colloidal solution applied to the surface of the main body.

16. The method for a holding material according to claim 15, wherein the colloidal solution is applied to the surface of the main body by spray coating, roll coating, or curtain coating.

17. The method according to claim 15, wherein the colloidal solution further comprises first inorganic fine particles or third inorganic fibers having a smaller aspect ratio than the aspect ratio of the second inorganic fibers.

18. The method according to claim 15, wherein a ratio ($W_1/(W_2+W_1)$) of a mass ($W_1$) of the first inorganic fine particles to a total mass ($W_2+W_1$) of the second inorganic fibers and the first inorganic fine particles is in the range of from about 0.1 to 0.9.

19. The method according to claim 17 further comprising:
dispersing second inorganic fine particles inside the main body,
wherein the second inorganic fine particles are the same as or different than the first inorganic fine particles.

20. The method according to claim 15, wherein the main body is a molded body.

* * * * *